US009547311B2

(12) United States Patent
Tamir et al.

(10) Patent No.: US 9,547,311 B2
(45) Date of Patent: Jan. 17, 2017

(54) PLANNING AND MONITORING OF AUTONOMOUS-MISSION

(71) Applicant: ISRAEL AEROSPACE INDUSTRIES LTD., Lod (IL)

(72) Inventors: Assaf Tamir, Kiryat Ono (IL); Amira Sharon, Nes Ziona (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 0 days.

(21) Appl. No.: 14/387,165

(22) PCT Filed: Mar. 19, 2013

(86) PCT No.: PCT/IL2013/050255
§ 371 (c)(1),
(2) Date: Sep. 22, 2014

(87) PCT Pub. No.: WO2013/140401
PCT Pub. Date: Sep. 26, 2013

(65) Prior Publication Data
US 2015/0051783 A1 Feb. 19, 2015

(30) Foreign Application Priority Data
Mar. 22, 2012 (IL) .......................... 218775
Nov. 27, 2012 (IL) .......................... 223283

(51) Int. Cl.
*G05D 1/10* (2006.01)
*G05D 1/00* (2006.01)
*G06F 9/30* (2006.01)

(52) U.S. Cl.
CPC .............. *G05D 1/10* (2013.01); *G05D 1/0088* (2013.01); *G06F 9/30* (2013.01)

(58) Field of Classification Search
CPC ............ G05D 1/10; G05D 1/0088; G06F 9/30
See application file for complete search history.

(56) References Cited

U.S. PATENT DOCUMENTS 5,170,352 A    12/1992  McTamaney et al.
2003/0209631 A1  11/2003  Harding et al.
(Continued)

OTHER PUBLICATIONS

Barney Pell et al.; "An Autonomous Spacecraft Agent Prototype"; In: Autonomous Agents. Edited by Bekey. Springer US, 1998; Retrieved on Mar. 20, 2014 from Internet; <http://groups.csail.mit.edu/mers/papers/agents97.pdf>.
(Continued)

*Primary Examiner* — Basil T Jos
(74) *Attorney, Agent, or Firm* — Kenealy Vaidya LLP

(57) ABSTRACT

The presently disclosed subject matter includes a method and system of planning autonomous mission, the mission being executed by one or more autonomous agents. A generic mission template is obtained, the generic mission template being constructed from a plurality of mission-objects and defines logical connections between the plurality of mission-objects, wherein each mission-object is configured to logically represent a respective type of mission-element; one or more mission-object in the generic mission template are associated with a respective real world mission-element, thereby generating a specific mission plan; with the help of a processor an agent-specific mission plan is generated for the one or more agents, based on the generic mission template and the specific mission plan, wherein an agent specific mission plan comprises tasks assigned to a respective designated agent and is compatible with the technical requirement of the respective designated agent.

24 Claims, 7 Drawing Sheets

(56) References Cited

U.S. PATENT DOCUMENTS

| | | |
|---|---|---|
| 2004/0205394 A1 | 10/2004 | Plutowski |
| 2005/0004723 A1 | 1/2005 | Duggan et al. |
| 2007/0156286 A1 | 7/2007 | Yamauchi |
| 2008/0004749 A1* | 1/2008 | Hostettler ............ G05D 1/0044 700/245 |
| 2009/0276105 A1 | 11/2009 | Lacaze et al. |
| 2010/0234993 A1 | 9/2010 | Seelinger et al. |
| 2011/0283285 A1* | 11/2011 | Saad .................. G06Q 10/0631 718/102 |
| 2012/0215348 A1 | 8/2012 | Skrinde |

OTHER PUBLICATIONS

International Search Report and Written Opinion of the International Search Report for PCT/IL2013/50255 dated Apr. 29, 2014.

* cited by examiner

PLANNING AND MONITORING OF AUTONOMOUS-MISSION

This application is a national phase filing under 35 C.F.R. §371 of and claims priority to PCT Patent Application No. PCT/IL2013/050255, filed on Mar. 19, 2013, which claims the priority benefit under 35 U.S.C. §119 of Israel Patent Application Nos. 218775 and 223283, filed on Mar. 22, 2012 and Nov. 27, 2012 respectively, which are hereby incorporated in their entireties by reference.

FIELD OF THE PRESENTLY DISCLOSED SUBJECT MATTER

This invention relates to the field of autonomously operating systems.

BACKGROUND

Autonomous systems are systems which can perform desired tasks without continuous human guidance. The degree of autonomy of different systems may vary and different systems can be autonomous in different ways. Some systems can have limited autonomy confined to limited tasks while others can be fully autonomous. As used herein the term "autonomous mission" includes any mission that includes the operation of an autonomous system.

The term "autonomous system" as used herein includes any kind of physical, virtual or other agent which can perform tasks based on a predefined logic without or with some limited degree of human intervention. Accordingly, the term "autonomous system" may refer to mechanical assembly or a component thereof designed for autonomously performing specific tasks such as, for example: a domestic robot designed for cleaning houses, an autonomous excavator designed for autonomously removing soil, a space exploration vehicle, an autonomous unmanned aerial vehicle (UAV) with an onboard autonomous surveillance camera, an unmanned surface vehicle (USV) on a shore patrol mission, a submersible autonomous vehicle, or machinery of a factory assembly line designed for completing one or more tasks (e.g. painting and/or inspecting a passing product), etc.

Additionally, the term "autonomous system" may also include any virtual intelligent agent (or a machine in which such a virtual intelligent agent is embedded) which exhibits a machine with autonomous capabilities. For example, autonomous system may refer to an agent embedded within a regular aircraft providing the aircraft with autonomous capabilities. For instance, enabling the aircraft to autonomously fly to a desired location and drop a load at that location without, or with limited intervention of the pilot.

In order to complete complex autonomous missions, many times, the cooperation and/or resource-sharing between several autonomous systems are required. The autonomous behavior which is needed for completing such missions can be achieved for example, through the combined effort of a plurality of autonomous systems, each system configured for completing one or more specific tasks. For example, an unmanned ground vehicle (UGV) which navigates to a specific location using coordinates provided by a UAV targeting that UGV with an electro optic payload and directing the UGV to its destination.

Each autonomous system participating in the mission is designed and specifically programmed with its specific instructions in order to accomplish its specific tasks. To this end, autonomous mission plans, which contain instructions to the participating autonomous systems in an autonomous mission, are often hardcoded or loaded into an autonomous mission computer which controls the operation of the autonomous system.

In general autonomous missions can be divided into two virtual layers of information: the physical layer and the tactical (or logical) layer. The physical layer defines "where" the mission will take place, or in other words the physical environment in which the system will operate. The tactical layer defines how the system will behave, or in other words what will be the decision-logic used for determining the various courses of action made by the system during its operation.

However, in practice information belonging to both layers is interwoven into the mission in different ways. In some cases missions are mostly terrain-driven where mission planning is almost exclusively map-based and decisions are based on the platform position and status. In other cases missions are time or event-driven, causing the platform to behave according to inputs from external sources. In any case the decision logic of an autonomous system is tied to the expected geographical conditions and/or an expected external input of a specific mission.

Missions which are closely tied to a certain geographical outset and/or to certain external input can perform well in the expected scenario but are almost useless for reuse or modification purposes. An autonomous system designed for performing a task in one specific environment cannot be easily converted to perform a different task in different geographical conditions and/or based on different external input. Often, the decision-logic is created en masse with the geographic pattern, and the two are so inherently intertwined such that any attempt to separate these virtual layers will result in the de-facto re-planning of the mission. Furthermore, due to the strong connection between the two intertwined physical and logical layers, modifying a task assigned to an autonomous system, in real-time during the execution of a mission, when the system is active—is practically impossible. This problem becomes more complicated where a number of autonomous robots coordinate, each performing specific tasks, in order to complete a desired mission. Instead, different autonomous systems are specifically reprogrammed and adapted to the new tasks, a process which is cumbersome and time consuming.

SUMMARY

According to one aspect of the presently disclosed subject matter there is provided a method of planning autonomous mission, the mission being executed by one or more autonomous agents, the method comprising: obtaining a generic mission template, the generic mission template being constructed from a plurality of mission-objects and defines logical connections between the plurality of mission-objects, wherein each mission-object is configured to logically represent a respective type of mission-element; associating one or more mission-object in the generic mission template with a respective real world mission-element, thereby generating a specific mission plan; generating, using a processor, based on the generic mission template and the specific mission plan, an agent-specific mission plan for each of the one or more agents, wherein an agent specific mission plan comprises tasks assigned to a respective designated agent and is compatible with the technical requirement of the respective designated agent.

According to certain embodiments of the presently disclosed subject matter the obtaining comprises: providing a plurality of mission-object types each type of mission-object configured to logically represent a respective type of real world mission-element; selecting mission-objects from the plurality of mission-object types; establishing connections between the plurality of selected mission-objects; and generating the generic mission template.

According to certain embodiments of the presently disclosed subject matter the method further comprising: simulating the mission plan execution thereby validating that the mission plan is free of errors or undesirable logical connection between different mission-objects.

According to certain embodiments of the presently disclosed subject matter the method further comprising: converting, each agent-specific mission plan into a format which is compatible with a respective designated agent.

According to certain embodiments of the presently disclosed subject matter the method further comprising: displaying on a display a graphical representation of the generic mission template; indicating, with the help of the graphical representation, a real-time progress of the real world mission-elements in respect of the mission plan.

According to certain embodiments of the presently disclosed subject matter the method further comprising: updating, during the execution of a mission a first mission-object in the generic mission template; responsive to the updating, further updating an agent-specific mission plan of an agent associated with the mission-object, thereby enabling to change the mission plan while the mission is in progress.

According to certain embodiments of the presently disclosed subject matter in case a second mission-object is logically connected to the first mission-object, determining whether the logical connection require to update instruction to a second agent associated with the second mission-object; and if it is, updating agent-specific mission plan of the second agent, in while the mission is progress.

According to another aspect of the presently disclosed subject matter there is provided a method of planning autonomous mission, the mission being executed by one or more autonomous agents, the method comprising: generating a plurality of mission-objects types each type of mission-object configured to logically represent a respective real world mission-element; generating a plurality of selected mission-objects from the plurality of mission-object types; establishing connections between the plurality of selected mission-objects; and generating a generic mission template.

According to another aspect of the presently disclosed subject matter there is provided a system of autonomous mission planning, the mission being executed by one or more autonomous agents, the system comprising at least one processor coupled to a memory and operable to: obtain a generic mission template, the generic mission template being constructed from a plurality of mission-objects and defines logical connections between the plurality of mission-objects, wherein each mission-object is configured to logically represent a respective type of mission-element; associate one or more mission-object in the generic mission template with a respective real world mission-element, thereby generating a specific mission plan; generate, using a processor, based on the generic mission template and the specific mission plan, an agent-specific mission plan for each of the one or more agents, wherein an agent specific mission plan comprises tasks assigned to a respective designated agent and is compatible with the technical requirement of the respective designated agent.

According to another aspect of the presently disclosed subject matter there is provided a system of planning autonomous mission, the mission being executed by one or more autonomous agents, the system comprising at least one processor coupled to a memory and operable to: generate a plurality of mission-objects types each type of mission-object configured to logically represent a respective real world mission-element; generate a plurality of selected mission-objects from the plurality of mission-object types; establish connections between the plurality of selected mission-objects; and generate a generic mission template.

According to another aspect of the presently disclosed subject matter there is provided a program storage device readable by machine, tangibly embodying a program of instructions executable by the machine to perform method steps of planning autonomous mission, the mission being executed by one or more autonomous agents, the method comprising: obtaining a generic mission template, the generic mission template being constructed from a plurality of mission-objects and defines logical connections between the plurality of mission-objects, wherein each mission-object is configured to logically represent a respective type of mission-element; associating one or more mission-object in the generic mission template with a respective real world mission-element, thereby generating a specific mission plan; generating, using a processor, based on the generic mission template and the specific mission plan, an agent-specific mission plan for each of the one or more agents, wherein an agent specific mission plan comprises tasks assigned to a respective designated agent and is compatible with the technical requirement of the respective designated agent.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
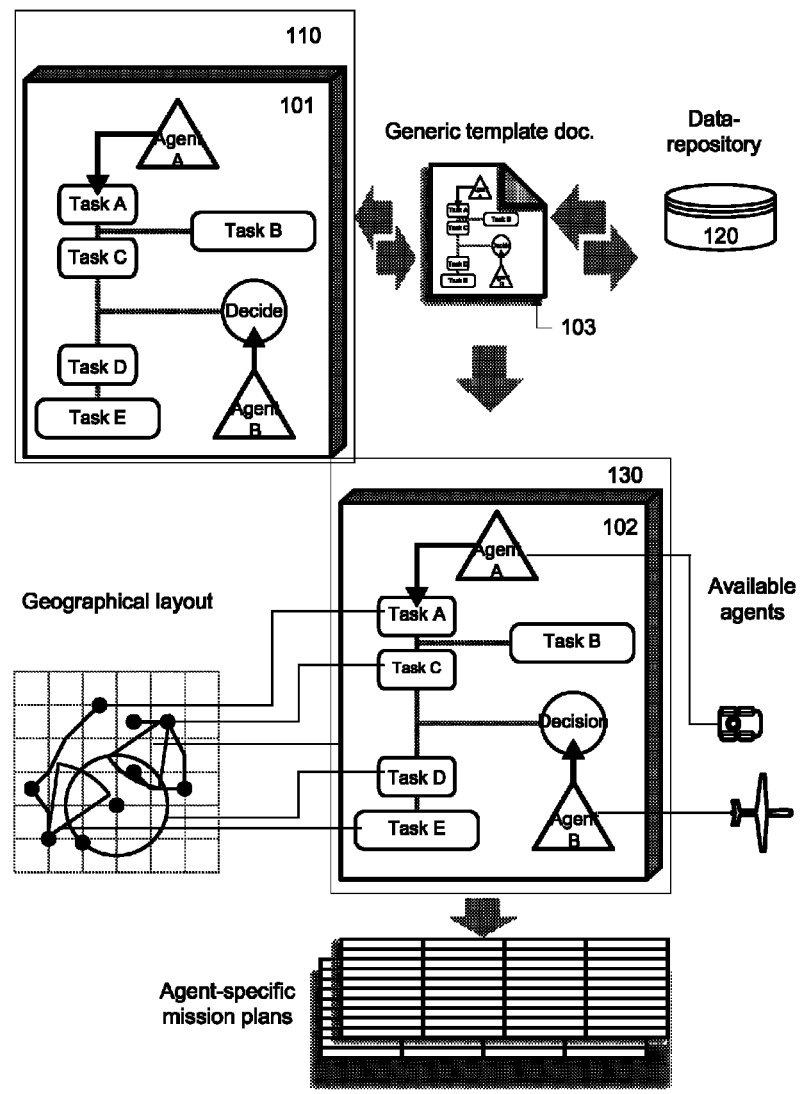
FIG. 1 is a schematic illustration of an example of a system in accordance with the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "obtaining", "associating", "generating", "selecting", "establishing", "simulating" or the like, include actions and/or processes of a computer processor that manipulate and/or transform data into other data, said data represented as physical quantities, e.g. such as electronic quantities, and/or said data representing the physical objects.

The operations in accordance with the teachings herein may be performed by a computer processor specially constructed for the desired purposes or by a general purpose computer processor specially configured for the desired purpose by a computer program stored in a computer readable storage medium.

Figure 2:
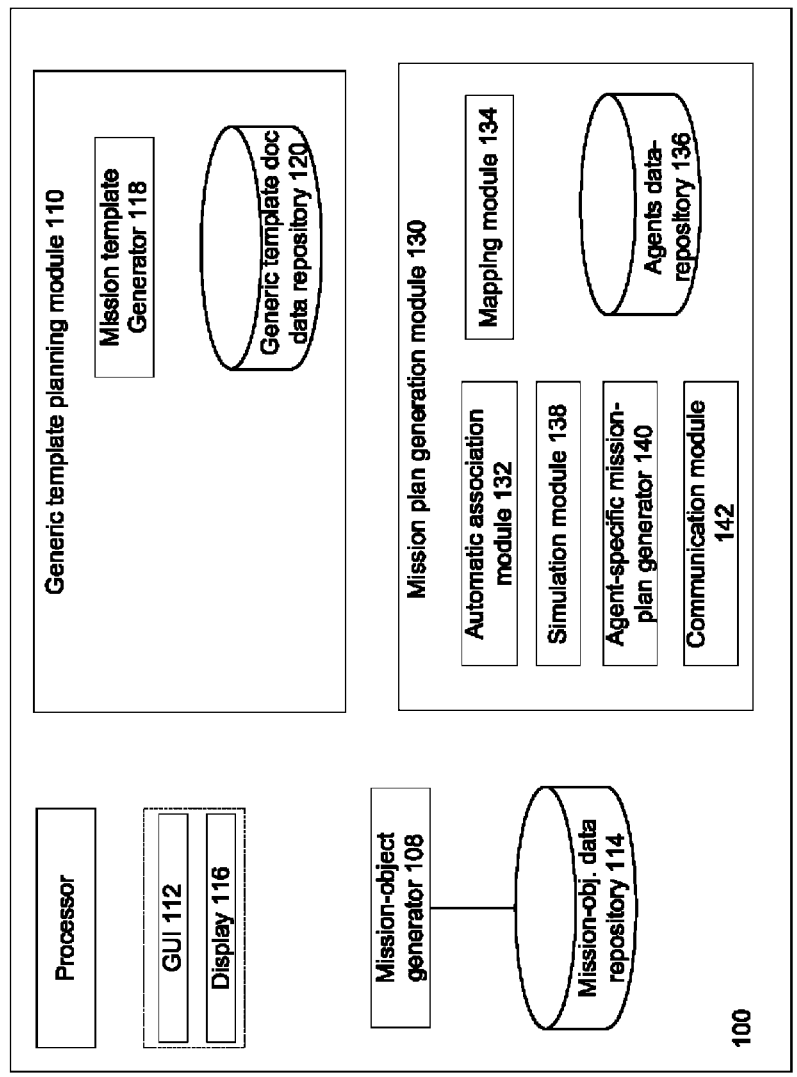
FIG. 2 is a functional block diagram schematically illustrating an example of a system, according to presently disclosed subject matter.
Figure 3:
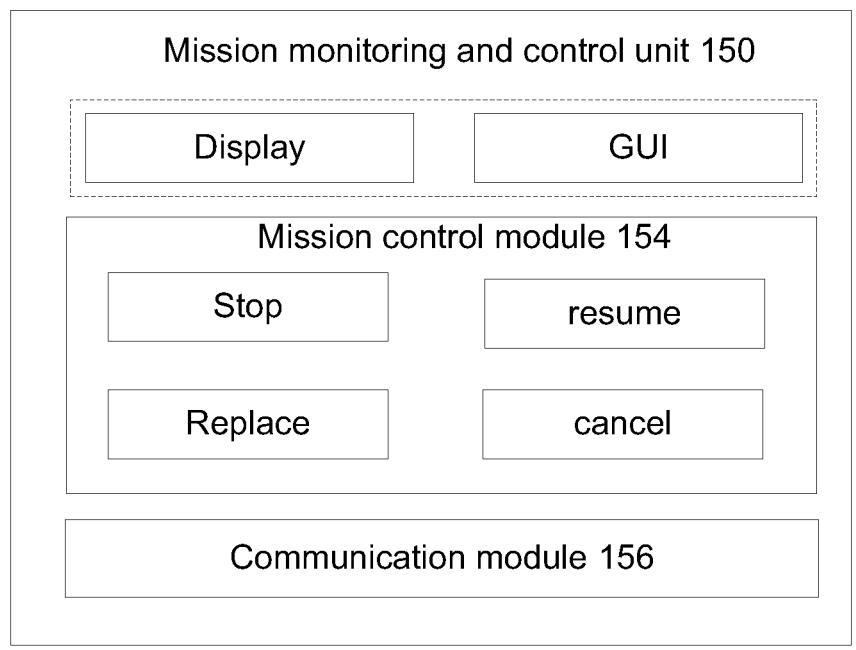
FIG. 3 is a functional block diagram schematically illustrating an example of a mission monitoring and control unit, according to presently disclosed subject matter.

Modules 110 and 130 in FIG. 2 and unit 150 in FIG. 3 comprises or are otherwise associated with at least one processor operable for executing operations as described above. The term "processor" should be expansively construed to cover any kind of electronic device with data processing capabilities, including, by way of non-limiting example, a personal computer, a server computer, a computing system, a communication device, a processor (e.g. digital signal processor (DSP), a microcontroller, a field programmable gate array (FPGA), an application specific integrated circuit (ASIC), etc.), any other electronic computing device, and or any combination thereof. Operative connections between the blocks and/or within the blocks may be implemented directly (e.g. via a bus) or indirectly, including remote connection. Connections between different components illustrated in FIGS. 1 to 4, may be provided via Wire-line, Wireless, cable, Internet, Intranet, power, satellite or other networks and/or using any appropriate communication standard, system and/or protocol and variants or evolutions thereof.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

In embodiments of the presently disclosed subject matter, fewer, more and/or different stages than those shown in FIGS. 5 to 8 may be executed. In embodiments of the presently disclosed subject matter one or more stages illustrated in FIGS. 5 to 8 may be executed in a different order and/or one or more groups of stages may be executed simultaneously. FIGS. 1, 2 and 3 illustrate a general schematic of the system architecture in accordance with an embodiment of the presently disclosed subject matter. The components in FIGS. 1, 2 and 3 may be centralized in one location or dispersed over more than one location. In other embodiments of the presently disclosed subject matter, the system may comprise fewer, more, and/or different components than those shown in FIGS. 1, 2 and 3.

The presently disclosed subject matter includes a method and system which enable to separate between the logical layer and the physical layer of the mission. The system architecture disclosed herein enables to generate, monitor and control the logical layer, before and during the execution of a mission, independently from the physical layer, and enable to adapt the logical layer to different real-world scenarios defining the physical layers.

FIG. 1 is a schematic illustration of a system in accordance with the presently disclosed subject matter. Generic template planning module 110, schematically illustrated in FIG. 1, is operable to generate generic mission templates. Generic mission templates provide a generic high-level logical representation of a mission plan, which is not tied to specific parameters such as a specific geographic location or specific external input sources, but instead describes the logic and inter-dependencies of a mission plan tactical goals. A generic mission plan is composed of a collection of generic mission-objects, each object being a high level representation of a respective mission parameter.

A mission plan is composed of mission parameters, which represent the building blocks of a mission. Each parameter represents a specific component or variable of a mission. Mission plan parameters includes for example, the different autonomous systems (referred herein as "agents") which take part in a mission and perform tasks (e.g. autonomous aircraft, autonomous vehicle, autonomous surveillance camera), coordinates and directions which define a progression path of the different mission agents and different tasks to be performed by different agents along their respective mission path, operational protocols of autonomous systems (including for example instructions to be carried out by implements or payloads onboard the autonomous system), tasks to be executed during a mission, etc.

In accordance with the presently disclosed subject matter, a mission parameter is enveloped and represented by a respective mission-object. A mission-object contains a set of attributes which enable to characterize a respective mission parameter. Any type of mission parameter can be represented by a respective type (otherwise known as a "class") of mission-object. Mission-objects may also include attributes, which optionally can be adjustable. The attributes of a mission-object define the characteristics of a respective parameter represented by the mission-object.

For example, a mission-object of type "agent" is an object which represents an autonomous system, being one type of a mission parameter. The mission-object type can include different attributes which can be used for characterizing any specific agent (or autonomous system). Another example can be a mission-object of type "coordinate" which represents a map coordinate, being another type of mission parameter of an autonomous mission. Yet another example of a mission-object can be of type "task" which represents another type of mission parameter, being a set of instructions for completing a task to be executed by a certain agent. Such instructions can include information defining the specification of a mission including for example: how a task should be executed; under which conditions the task should be executed; and codependences between different objects in a mission.

Instructions can also specify a desired degree of autonomy of a mission. For example, a mission-object of type "task" can include attributes or other information, defining which operations of a task should be performed automatically and which operations should be performed by an operator.

Mission-objects can have different logical structures including a hierarchical structure, such that certain objects of higher hierarchy encompass other mission-object of lower hierarchy. For, example a mission-object of type "path" which defines a progression path of an agent can contain an array of mission-objects of type "coordinate" each comprising attributes such as a map coordinate and direction which together provide the progression path.

The generation of a mission plan is enabled by a tool/framework which can be used for generating different generic mission templates. This can be accomplished by selecting a set comprising different mission-objects and establishing logical connection between them.

FIG. 1 includes a schematic illustration of a generic mission template 101 displayed on a screen associated with generic template planning module 110, which is described in more detail below. Note that the generic mission template shown in FIG. 1 comprises a plurality of mission-objects connected together. For example, "agent A" and "agent B" are mission-objects representing two respective agents, "Task A" is a mission-object representing for example a maneuvering task assigned to agent A, and "Task C" is a mission-object representing for example a surveillance mission assigned to agent A. As explained above the generic mission template does not disclose which real world agent is associated with agent A, and what are the specific details of each of the tasks.

The attributes in each mission-object can be assigned with actual values (parameters) depending on the specific mission. Thus, the same mission-objects of the same generic mission template can be assigned with one set of values in one mission and with a different set of values in a different mission. For example, a mission-object of type "progression path" specifying a set of map coordinates defining a desired progression path can be assigned with specific map coordinate values based on the desired location of a specific mission.

The use of mission-objects provide flexibility during the generation of the generic mission template as mission-objects can be easily added or removed in an intuitive process. Furthermore, as a generic mission template is not tied to a specific geographical scenario or any other real-world physical element, but rather represents the logical connections between the different mission-objects, it can be later adapted to any specific geographical scenario and/or array of agents with different capabilities. In addition, parts of, or a complete generic mission template, can be stored and used at later occasions as parts of other mission templates.

FIG. 2 illustrates a block diagram schematically illustrating an example of a system according to presently disclosed subject matter. Generic template planning module 110 is operable to enable to select a collection of mission-objects and connect between the selected mission-object in order to create a logical structure which generically represents a mission template.

Generic template planning module 110 can comprise or otherwise be associated with a mission object data-repository 114 which is used for storing generic mission-objects. The mission objects can be generated for example by mission-object generator 108, which can be operable to generate different types of mission-objects and store them, for example, in data-repository 114.

Selection of mission-objects can be performed either automatically by a preprogrammed computer device or by a human operator or planner. For example, information indicative of required mission-objects and required logical connections between the mission-objects for generating a generic mission-template can be made available to generic template planning module 110, which can be configured to automatically generate, based on this information, a respective generic mission template.

Additionally or alternatively, Generic template planning module 110 comprises a user interface, which can be for example a graphical user interface (GUI 112) and display 116 (e.g. LCD screen). The user interface and display enable an operator to select mission-objects and create a mission template document, which represents a generic mission template. The mission template document can be for example a graphical representation of the generic mission template. The different available mission-objects can be graphically displayed to the operator who can select a desired set of mission-objects and organize the selected mission-objects based on the mission requirements and logic.

Generic template planning module 110 can also be operable to force certain constraints on the operator, which enable to guide the operator throughout the process of creating the generic mission template, in order to ensure that the generic mission template is being created in accordance with predefined logic and rules. Optionally, the constraints can be adjustable. The constraints can also be provided by the attributes or characteristics embedded in the mission-objects. Once created, mission template documents 103 can be stored in template doc data-repository 120 for future use and reference.

Once the representation of a generic mission template in a mission template document is completed, mission template generator 118 can be operable to compile the document, retrieve respective mission-objects from data-repository 114 and generate a data file representing the generic mission template based on the mission template document. Generic mission templates can also be stored in a data-repository (e.g. data-repository 120).

System 100 further comprises a mission plan generation module 130 operable to generate a mission plan based on a given generic mission template. A generic mission template can be retrieved, for example, from data-repository 120. As explained above a generic mission template is made up of a collection of mission-objects and provides a logical representation of a mission plan. Mission plan generation module 130 enables to assign real world mission-elements corresponding to an actual mission to the mission-objects in the generic mission template and thereby create a specific mission plan ready to be executed.

The term "mission-element" is used herein to include specific real world objects or information. For example, a generic mission template may include one or more mission-objects of type "agent". Corresponding mission-elements can be any one of autonomous ground vehicles in a fleet of autonomous ground vehicles which is available for performing the mission. In another example, a generic mission template may include one or more mission-objects of type "task surveillance". Corresponding mission-element can be any one of surveillance protocols (i.e. instructions defining a surveillance task) from a plurality of available surveillance protocols.

In some cases all or part of the assignment of actual mission-elements to a mission template can be done automatically. To this end, mission plan generation module 130 can comprise automatic association module 132 operable to automatically associate between mission-objects in a selected mission template and real world mission-elements and values. For, example, a given mission template may be assigned with mission-elements based on some type of predefined logic. Alternatively or additionally, a given mission template may be assigned with default mission-elements where information specifying these default mission-elements can be made available to automatic association module 132 (e.g. in form of data file). Automatic association module 132 can be operable to associate between mission-objects, in the mission template, and respective mission-elements based on this information.

In other cases all or part of the assignment process is performed by a human operator. To this end, mission plan generation module 130 can be associated with a UI (e.g. graphical user interface), and display enabling a human operator to interact with system 100. UI 112 allows a human operator to review a selected generic mission template and assign to different mission-objects in the generic mission template respective mission-elements and values.

Optionally, a real world mission-element can be associated with a given mission-object only if it matches (possibly with some degree of freedom) the attributes specified by the mission-object. For example, if the mission-object of type "agent" is characterized as being a ground vehicle, selecting an avionic vehicle will not be allowed.

The available mission-elements and values can be stored in one or more designated data repositories. For example, data-repository 136 can comprise information regarding the available mission agents. This information can be displayed to the operator who can select for each relevant mission-object of type "agent" a real world agent which will perform the tasks assigned to the agent, based on the specification in the generic mission template. Mission plan generation module 130 can also comprise a mapping module 134 which is operable to provide geographical information regarding the terrain of the specific mission and determine the required progression path of each "maneuver" mission-object.

Once the mission-objects in the generic mission template are associated with real world mission-elements a mission plan ready to be executed is obtained. Generated mission plans can be stored in a data-repository associated with mission plan generation module 130 (e.g. data-repository 144).

Mission plan generation module 130 can further comprise a simulation module 138 operable for validating the mission plan. Simulation module 138 can be operable to run a simulation of the generated mission plan. This simulation enables to determine, before the mission plan is actually executed, whether the mission plan is feasible and whether it comprise errors.

In case errors are detected in the mission plan the simulation module 138 can issue a warning indicating the error. The operator can then correct the error. For example, in case it is determined that a selected agent is not fit to perform one of its designated tasks, a different agent can be selected in its place. Optionally, simulation module can be configured to propose a remedy to the detected error.

Once the mission plan is validated, the tasks assigned to each agent and possibly also additional parts of the entire mission plan are transmitted to the respective agent. To this end mission plan generation module 130 comprises an agent-specific mission plan generator 140, which is operable to generate a specific mission plan (referred herein as "agent-specific mission plan") to each agent which take part in mission. An agent-specific mission plan comprises specific instructions to be carried during the mission by a respective specific agent. Agent-specific mission plan generator 140 can be operable to translate the relevant tasks and possibly the entire mission plan to a format which is compatible with the technical requirements of the relevant agent. Agent-specific mission plan generator 140 can comprise or have access to one or more translators, each translator able to convert a mission plan to a format of respective designated agent of a given type. The agent mission plans are transmitted to each of the respective designated agents with the help of communication module 142.

It should be noted that although generic logical template planning module 110 and mission plan generation module 130 are illustrated as a single operational unit, this is merely one none limiting example and in other cases generic logical template planning module 110 and mission plan generation module 130 can be separated into individual operational unit, and/or distributed in different locations.

Once the mission plan is executed the mission progress can be monitored by mission monitoring and control unit 150 illustrated in FIG. 3. Mission monitoring and control unit 150 can be configured as part of system 100. Additionally or alternatively, Mission monitoring and control unit 150 can be separated from system 100 and function as an individual operational unit. Mission monitoring and control unit 150 can comprise a user interface including a GUI and a display enabling an operator to monitor the progression of the mission. Mission monitoring and control unit 150 can be configured to provide a plurality of functions. For example, Mission monitoring and control unit 150 can comprise mission control module 154, which enables to control the progression of the mission for example, by stopping (using a stop module) and resuming (using a resume module) the mission.

Mission monitoring and control unit 150 can also enable to replace, while the mission is in progress, an existing mission-element with different element. For example, assuming that an autonomous vehicle, taking part in a mission breaks down, an operator can assign, during the execution of the mission, a different autonomous vehicle to the respective mission-object and thereby enable its replacement. In another example, in case it is determined, while the mission is in progress, that the selected progression path (route) of an agent is not traversable an alternative route can be selected and assigned to the respective mission-object representing the route.

Mission monitoring and control unit 150 comprises communication module 156 which allows two-way transfer of information, to enable mission monitoring and control unit 150 to maintain open communication with the different agents in order to perform its functions.

Optionally, association of new mission-elements during the progress of a mission can be performed automatically by unit 150. Instructions to replace a mission-element can be embedded within the mission plan. For example, instruction provided as part of a mission plan (e.g. as part of information provided in respect of a task) may include information indicating that a given agent should be replaced in case a certain criterion is met. The mission-object of the given agent can also include an attribute indicating a replacement mission-element, in case replacement of the agent is required.

When an agent is being replaced mission monitoring and control system 150 can be operable to receive real-time information in respect of the available replacement agents, communicate with a selected replacement agent, associate the replacement agent with the mission plan and provide the replacement agent with an agent-specific mission plan.

Figure 4:
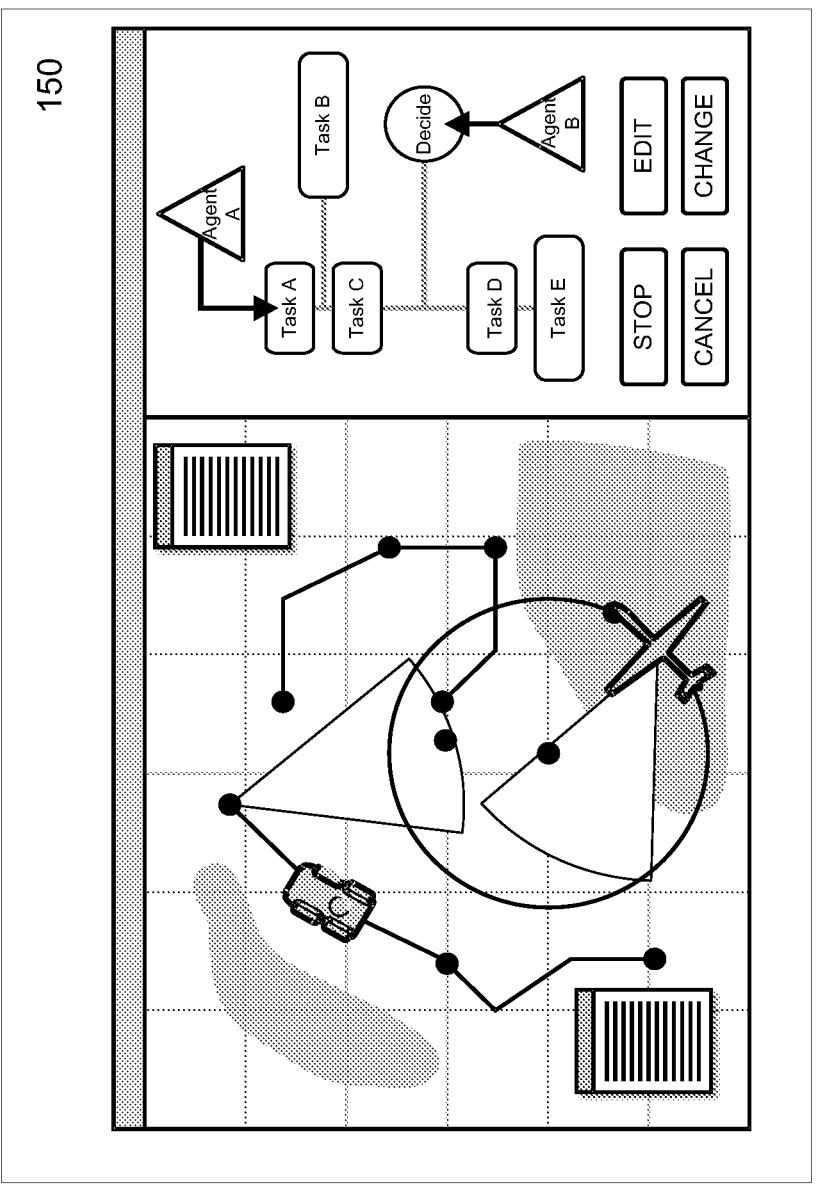
FIG. 4 is a schematic illustration exemplifying a GUI displayed by a mission monitoring and control unit in accordance with the presently disclosed subject matter.

FIG. 4 illustrates a schematic illustration of an example of a GUI and display of mission monitoring and control unit 150, in accordance with the presently disclosed subject matter. Note that the progression of the tasks assigned to each agent can be monitored. This is due to the fact that each mission is generated from a generic mission template which provides the logical backbone of the mission. Since the logical layer is represented by the generic mission template which is defined independently from the specific real-world mission-elements, the logical progression of the mission can be easily monitored by following the generic mission template.

In addition, due to the fact that each mission-element is represented by a respective mission-object in generic mission template, any one of the mission-elements can be replaced during the execution of the mission by cancelling the association of a first mission-element to a respective mission-object and associating a different mission-element to the mission-object. Furthermore, as monitoring of the progression of a mission becomes simpler this helps to reduce the number of personals which are required for monitoring a mission of a given scale.

Figure 5:
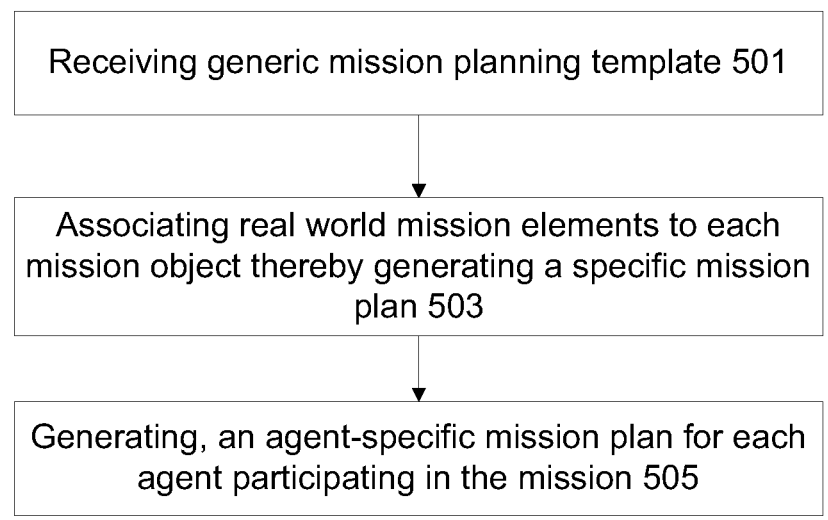
FIG. 5 is a flowchart demonstrating an example of operations performed, in accordance with the presently disclosed subject matter.

Turning to FIG. 5 illustrating a flowchart of operations performed, in accordance with the presently disclosed subject matter. Operations describe with reference to FIG. 5 can be executed for example by system 100 described above with reference to FIGS. 1 and 2.

At block 501 a generic mission template is received. As explained above a generic mission template provides a logical representation (corresponding to the logical layer) of a mission plan. The generic mission template comprises at least one mission-object representing a respective mission parameter. The received generic mission template can be locally generated as described above with reference to FIGS. 1 and 2, or it may be received from an external source.

At block 503 each mission-object in the generic mission template is associated with a respective real world mission-element in order to create a mission plan. Association between mission-objects and respective mission-elements is performed based on the characteristics of the required mission-element as defined by the respective mission-object. As mentioned above association between mission-objects and mission-elements can be done automatically by system 100 and/or with the help of a human operator.

At block 505 an agent-specific mission plan is generated for each agent participating in the mission. Tasks specified in the mission plan are assigned to specific agents participating in the mission. Each agent-specific mission plan species the tasks assigned to the respective agent and provides instruction for completing the tasks. Each agent-specific mission plan is generated in (or translated into) a format which is compatible with the destined agent.

Figure 6:
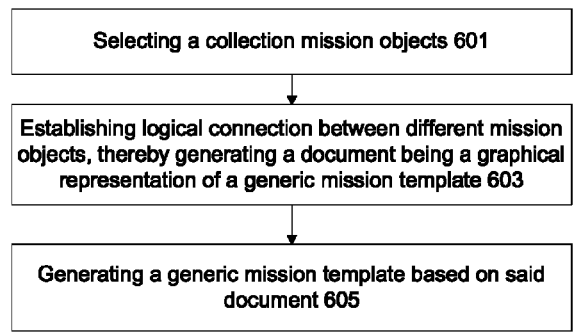
FIG. 6 is a flowchart demonstrating an example of operations performed, in accordance with the presently disclosed subject matter.

Turing now to FIG. 6 illustrating a flowchart of operations performed, in accordance with the presently disclosed subject matter. FIG. 6 exemplifies the process of generating a generic mission template. This process can take place, for example, before the process described above with reference to FIG. 5. At the onset, a collection of mission-objects are selected (block 601). As explained above the selection of mission-objects can be performed automatically by a pre-programmed computer device. Alternatively, the selection can be performed by a human operator, who can be interfacing, for example, with a graphical user interface. The mission-objects can be selected from a list of mission-objects, which can optionally be graphically visualized to the operator.

Once mission-objects are selected logical connections, which define the progression of the mission, are determined between the selected mission-objects (block 603). As before this operation can be performed automatically by a preprogrammed computer device and/or by a human operator.

Throughout the process of generating a generic mission template, more mission-objects can be added and connected while other mission-objects can be removed from the generic mission template. At the end of this stage representation (e.g. graphical or tabular representation) of the generic mission template is generated. The representation can be saved as a document (e.g. containing a drawing) illustrating the generic mission template. The document can then be compiled (block 605). During compilation a generic mission template is generated which comprises a mission-object for each mission-object which is illustrated in the document.

Figure 7:
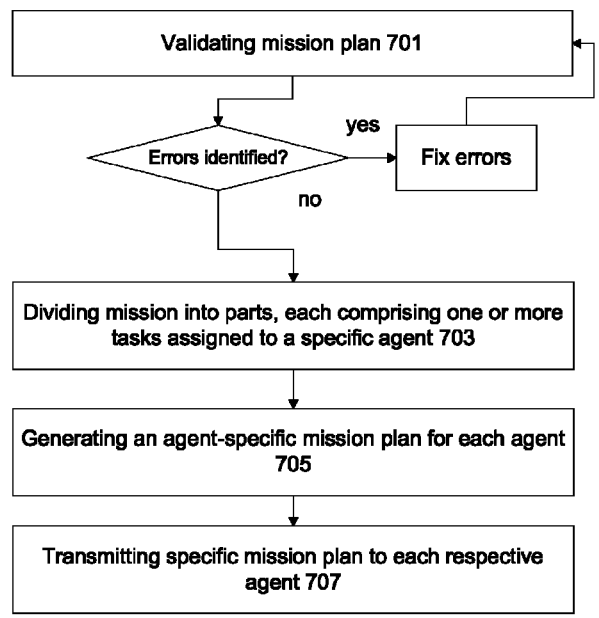
FIG. 7 is a flowchart demonstrating an example of operations performed, in accordance with the presently disclosed subject matter.

FIG. 7 is a flowchart of operations performed, in accordance with the presently disclosed subject matter. FIG. 7 exemplifies the operation described above with reference to block 505 in FIG. 5 in more detail. After a mission plan is generated, the mission plan is validated in order to ensure that it is a feasible mission plan and contains no errors or undesirable logical connection between different mission-objects (block 701). To this end the mission plan can be simulated (e.g. by simulation module 138 running a simulation program). The results of the simulation indicate whether any errors in the mission plan have been identified. In case an error in the mission plan has been identified, the error can be fixed (e.g. by a human operator) and then the simulation can be run again. Otherwise, the process continuous to block 703, where the mission plan is divided into mission parts, each part including a group of tasks comprising one or more tasks, assigned to a specific agent participating in the mission (e.g. with the help of agent-specific mission plan generator 140). Alternately, instead of dividing the mission plan into parts, each task in the mission plan can be marked to indicate to which of the agents the task is assigned.

At block 705 an agent-specific mission plan is generated for each agent participating in the mission. Each agent-specific mission plan (or in some cases the entire mission plan) is converted into (or generated in) a format which is compatible with the technical requirement of a respective agent designated to execute this agent-specific mission plan (e.g. with the help of agent-specific mission plan generator 140). For example, the mission plan can be converted into an appropriate communication protocol adapted to be communicated to the respective agent. In another example, the mission plan can be translated into a programming language which is compatible with the respective designated agent.

Each agent-specific mission plan is then transmitted over a communication link (e.g. with the help of communication module 142) to the respective designated agent (block 707).

Figure 8:
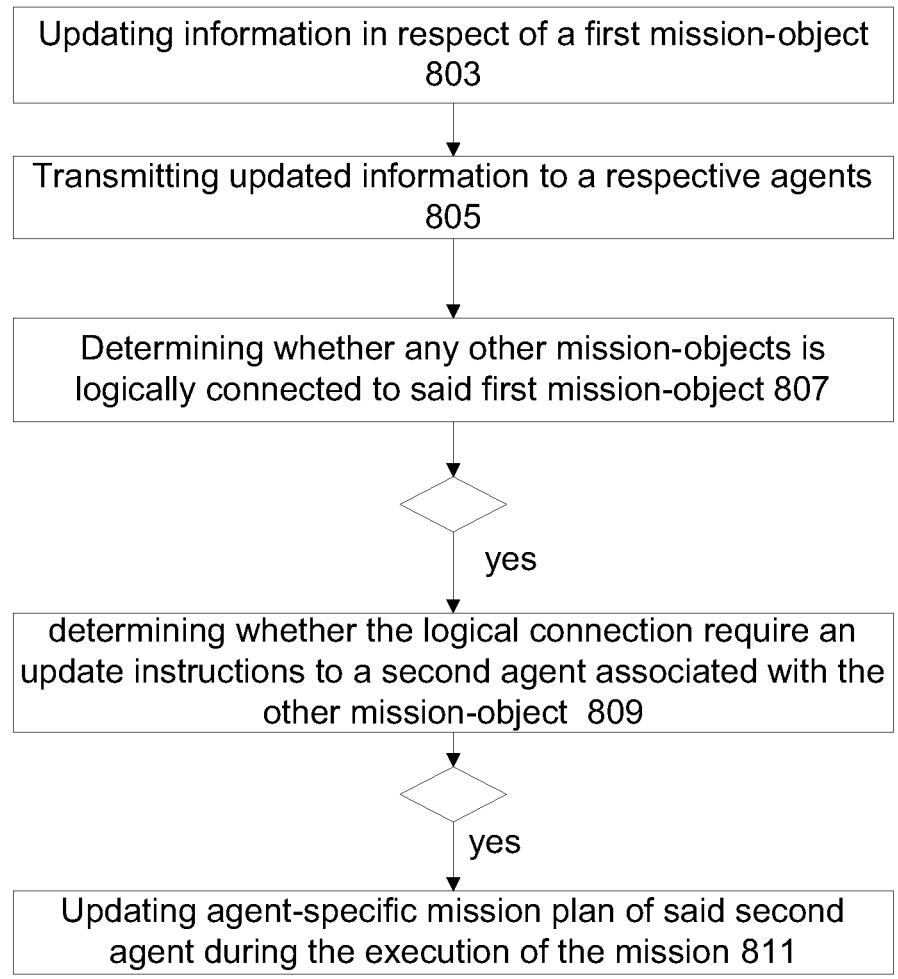
FIG. 8 is a flowchart demonstrating an example of operations performed during execution of a mission plan, in accordance with the presently disclosed subject matter.

FIG. 8 is a flowchart demonstrating an example of operations performed during execution of a mission plan, in accordance with the presently disclosed subject matter. The operations described with reference to FIG. 8 can be performed, for example with the help of mission monitoring and control unit 150 described above with reference to FIG. 3. As mentioned above mission monitoring and control unit 150 enables to maintain constant communication with the different agents participating in the mission and thereby monitor the progression of the mission.

Assuming at some point a decision is made to update information related to one or more of the mission-objects (block 803) of an ongoing mission. For example, in case an autonomous vehicle becomes disabled, an operator may choose to associate a functioning autonomous vehicle with the mission-object which is now associated with the none-functioning autonomous vehicle. By this the functioning autonomous vehicle can replace the none-functioning vehicle and complete its designated tasks. In a different scenario, an operator may choose to replace a surveillance protocol of a surveillance device with a different protocol, or in case for example a surveillance device (e.g. camera) becomes disabled, an operator may choose to cancel the surveillance task assigned to the disabled surveillance device.

A decision to update information related to a mission-object (such as replace a mission-element associated with the mission-object) can be made automatically. The logic for making this decision can be embedded within the generic mission template, used to generate the specific mission plan. A decision to update information related to a mission-object can also be made by a human operator.

Information in respect of the relevant mission-object can be updated, and a different mission-element can be associated with the updated mission-object. For example, a mission-object associated with a first autonomous vehicle can be associated with a second autonomous vehicle in place of the first one. The updated information which is sent to the respective agents can include a message unlinking the first agent and a message to the second agent providing agent-specific mission plan (block 805).

After the second (replacement) agent is updated and its tasks are updated accordingly, it is determined whether other agents participating in the mission are logically connected to the replacement agent (block 807). This can be accomplished by surveying the generic mission template and searching for any logical connections between the (first) mission-object associated with the replacement agent, and other mission-objects associated with other agents. This task can be accomplished for example, by mission monitoring and control unit 150, which can be operable, responsive to an update of a mission-object, to check whether other mission-objects are logically connected to the updated one.

In case a logical connection between other agents is found, it is next determined whether any one of the other agents should be updated as a result of the update of the first mission-object (block 809). Again this can be accomplished with the help of mission monitoring and control unit 150. For example, assume that as suggested above, the operation of a surveillance device has been terminated, and further assume that an autonomous vehicle which is participating in the mission is instructed to proceed and advance to its next location only after it receives a confirmation signal from the surveillance device. However, since the surveillance device is incapacitated it cannot send the confirmation signal and therefore the autonomous vehicle will maintain its current position. Thus, after it has been established (based on the generic mission template) that the surveillance device and the autonomous vehicle are logically connected, it is determined whether the update made to the first agent (in this case, shutting off the surveillance device) affects the other agent. If yes, the other agents are updated accordingly. For example, in the current example, the instruction given to the autonomous vehicle to proceed only after a confirmation signal is received from the surveillance device is cancelled.

It will also be understood that the system in accordance with the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable memory tangibly embodying a program of instructions executable by the machine for executing the method of the presently disclosed subject matter.

FIGS. 2 and 3, described above, illustrate block diagrams of general schematic of a system-architecture in accordance with an embodiment of the presently disclosed subject matter. Certain embodiments of the present invention are applicable to the architecture of a computer system described with reference to FIGS. 2 and 3. However, the invention is not bound by the specific architecture; equivalent and/or modified functionality may be consolidated or divided in another manner. Those versed in the art will readily appreciate that the invention is, likewise, applicable to different computer systems. In different embodiments of the invention the functional blocks and/or parts thereof may be placed in a single or in multiple geographical locations (including duplication for high-availability).

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A computer-implemented method of generating a mission plan for an autonomous mission, the mission plan being executed by one or more autonomous agents, the method comprising:
   obtaining a generic mission template from a computer storage, the generic mission template being constructed from a plurality of mission-objects and defines logical connections between the plurality of mission-objects, wherein each mission-object is configured to logically represent a respective type of mission-element;
   associating one or more mission-object in the generic mission template with a respective real world mission-element, thereby generating a specific mission plan;
   using a processor for:
   generating, based on the generic mission template and the specific mission plan, an agent-specific mission plan for each of said one or more agents, wherein an agent-specific mission plan comprises tasks assigned to a respective designated agent allowing for the controlling and updating in real-time of the tasks assigned to a specific agent individually from other agents operating under the same mission plan;
   converting each agent-specific mission plan into a format which is compatible with the technical requirement of the respective designated agent;
   continuously monitoring the progress of the mission, identifying in real-time that an update to a mission-element is required and updating the mission-element accordingly; and
   determining, based on the generic mission plan whether there are logical connections between the updated mission-element and other mission-elements, and if yes, updating the other mission-elements to enable progress of the mission.

2. The method according to claim 1, wherein said obtaining comprises:

providing a plurality of mission-object types each type of mission-object being a variable configured to logically represent a respective type of real world mission-element;

selecting mission-objects from said plurality of mission-object types;

establishing connections between said plurality of selected mission-objects; and generating said generic mission template.

3. The method according to claim 1, further comprising:

simulating the mission plan execution thereby validating that the mission plan is free of errors or undesirable logical connection between different mission-objects.

4. The method according to claim 1, further comprising, transmitting each agent-specific mission plan to a respective designated agent.

5. The method according to claim 1, further comprising:

displaying on a display a graphical representation of the generic mission template;

indicating, with the help of said graphical representation, a real-time progress of said real world mission-elements in respect of the mission plan.

6. The method according to claim 1, further comprising:

updating, during the execution of the mission, information related to a first mission-object in said generic mission template;

responsive to said updating, associating a new mission-element with said first mission-object, thereby enabling to change the mission plan while the mission is in progress.

7. The method according to claim 6, wherein said new mission-element is an agent, and said information includes an agent-specific mission plan of the agent.

8. The method according to claim 6, further comprising:

in case a second mission-object in said generic mission template is logically connected to said first mission-object, updating information in respect of mission-element associated with said second mission-object.

9. The method according to claim 6, wherein said updating is performed automatically with the help of a processor, based on predefined logic.

10. The method according to claim 1, wherein said associating is performed automatically based on predefined logic.

11. A computer-implemented method of generating a mission plan for an autonomous mission, the mission plan being executed by one or more autonomous agents, the method comprising:

generating a plurality of mission-objects types each type of mission-object being a variable configured to logically represent a respective type of real world mission-element;

generating a plurality of selected mission-objects from said plurality of mission-object types;

establishing logical connections between said plurality of selected mission-objects;

generating a generic mission template;

using a processor for:

generating, based on the generic mission template and a specific mission plan, an agent-specific mission plan for each of said one or more agents, wherein an agent-specific mission plan comprises tasks assigned to a respective designated agent allowing for the controlling and updating in real-time of the tasks assigned to a specific agent individually from other agents operating under the same mission plan;

converting each agent-specific mission plan into a format which is compatible with the technical requirement of the respective designated agent;

continuously monitoring the progress of the mission, identifying in real-time that an update to a mission-element is required and updating the mission-element accordingly; and determining, based on the generic mission plan whether there are logical connections between the updated mission-element and other mission-elements, and if yes, updating the other mission-elements to enable progress of the mission.

12. The method according to claim 11, further comprising:

associating one or more mission-object in the generic mission template with a respective real world mission-element, thereby generating the specific mission plan.

13. The method according to claim 11, wherein said generating of the generic mission template is performed automatically with the help of a processor based on predefined logic.

14. A computer-implemented system of generating a mission plan for an autonomous mission, the mission plan being executed by one or more autonomous agents, the system comprising at least one processor coupled to a memory and operable to:

obtain a generic mission template from a computer storage, the generic mission template being constructed from a plurality of mission-objects and defines logical connections between the plurality of mission-objects, wherein each mission-object is configured to logically represent a respective type of mission-element;

associate one or more mission-object in the generic mission template with a respective real world mission-element, thereby generating a specific mission plan;

generate, using the processor, based on the generic mission template and the specific mission plan, an agent-specific mission plan for each of said one or more agents, wherein an agent-specific mission plan comprises tasks assigned to a respective designated agent allowing for the controlling and updating in real-time of the tasks assigned to a specific agent individually from other agents operating under the same mission plan;

convert each agent-specific mission plan into a format which is compatible with the technical requirement of the respective designated agent;

continuously monitor the progress of the mission, identify in real-time that an update to a mission-element is required and update the mission-element accordingly; and determine, based on the generic mission plan whether there are logical connections between the updated mission-element and other mission-elements, and if yes, update the other mission-elements to enable progress of the mission.

15. The system according to claim 14 wherein said processor is further operable to:

provide a plurality of mission-object types, each type of mission-object being a variable configured to logically represent a respective type of real world mission-element;

select mission-objects from said plurality of mission-object types;

establish connections between said plurality of selected mission-objects; and generate said generic mission template.

16. The system according to claim 14, wherein said processor is further operable to:
   simulate the mission plan thereby validate that the mission plan is free of errors.

17. The system according to claim 14, wherein said processor is further operable to:
   transmit each agent-specific mission plan to a respective designated agent.

18. The system according to claim 14, further comprising a display, wherein said processor is further operable to:
   display on the display a graphical representation of the generic mission template;
   indicate, with the help of said graphical representation, a real-time progress of said real world mission-elements in respect of the mission plan.

19. The system according to claim 14, wherein said processor is further operable to:
   update, a first mission-object in said generic mission template; and
   responsive to said update, further update an agent-specific mission plan of an agent associated with said mission-object, thereby enabling to change the mission plan while the mission is in progress.

20. The system according to claim 19, wherein said processor is further operable to:
   in case a second mission-object is logically connected to said first mission-object, determine whether the logical connection require to update instruction to a second agent associated with the second mission-object;
   and if it is, update agent-specific mission plan of said second agent, while the mission is in progress.

21. The system according to claim 19 wherein said processor is operable to automatically perform said update, based on predefined logic.

22. The system according to claim 14, wherein said processor is operable to automatically associate one or more mission-object in the generic mission template with a respective real world mission-element, based on predefined logic.

23. A computer-implemented system of generating a mission plan for an autonomous mission, the mission plan being executed by one or more autonomous agents, the system comprising at least one processor coupled to a memory and operable to:
   generate a plurality of mission-objects types each type of mission-object configured to logically represent a respective real world mission-element;
   generate a plurality of selected mission-objects from said plurality of mission-object types;
   establish connections between said plurality of selected mission-objects;
   generate a generic mission template;
   generate, using the processor, based on the generic mission template and a specific mission plan, an agent-specific mission plan for each of said one or more agents, wherein an agent-specific mission plan comprises tasks assigned to a respective designated agent allowing for the controlling and updating in real-time of the tasks assigned to a specific agent individually from other agents operating under the same mission plan;
   convert each agent-specific mission plan into a format which is compatible with the technical requirement of the respective designated agent;
   continuously monitor the progress of the mission, identify in real-time that an update to a mission-element is required and update the mission-element accordingly; and
   determine, based on the generic mission plan whether there are logical connections between the updated mission-element and other mission-elements, and if yes, update the other mission-elements to enable progress of the mission.

24. A program storage device readable by machine, tangibly embodying a program of instructions executable by the machine to perform method steps of planning autonomous mission, the mission being executed by one or more autonomous agents, the method comprising:
   obtaining a generic mission template from a computer storage, the generic mission template being constructed from a plurality of mission-objects and defines logical connections between the plurality of mission-objects, wherein each mission-object is configured to logically represent a respective type of mission-element;
   associating one or more mission-object in the generic mission template with a respective real world mission-element, thereby generating a specific mission plan;
   using a processor for:
   generating, based on the generic mission template and the specific mission plan, an agent-specific mission plan for each of said one or more agents, wherein an agent-specific mission plan comprises tasks assigned to a respective designated agent allowing for the controlling and updating in real-time of the tasks assigned to a specific agent individually from other agents operating under the same mission plan;
   converting each agent-specific mission plan into a format which is compatible with the technical requirement of the respective designated agent;
   continuously monitoring the progress of the mission, identifying in real-time that an update to a mission-element is required and updating the mission-element accordingly; and
   determining, based on the generic mission plan whether there are logical connections between the updated mission-element and other mission-elements, and if yes, updating the other mission-elements to enable progress of the mission.

* * * * *